Patented Aug. 7, 1928.

1,680,070

UNITED STATES PATENT OFFICE.

GEORG SCHROETER, OF BERLIN, GERMANY.

PURIFICATION OF NAPHTHALENE.

No Drawing. Original application filed August 29, 1921, Serial No. 496,639, and in Germany May 13, 1916. Divided and this application filed March 30, 1925. Serial No. 19,532.

The present invention relates to purification of commercial naphthalene, and particularly to a purification thereof to an extent sufficient to remove therefrom elements which act as catalyzer poisons when the naphthalene is subjected to hydrogenation in the presence of a catalyst. The present application is a division of my co-pending application Ser. Nr. 496,639, filed August 29th, 1921, which has matured into Patent Number 1,582,310.

It has long been known that even the purest commercial (i. e. technically produced) naphthalene stubbornly retains certain small amounts of impurities, especially methylated coumarone and corresponding sulfur compounds, which substances cause a red coloration when commercial naphthalene is subjected to treatment with hot concentrated sulfuric acid. It was also known that by boiling commercial naphthalene with acetate of mercury in alcoholic solution, certain mercury compounds were produced which were not mercury compounds of thionaphthalene. It has also previously been known that ordinary purified naphthalene contains sulfur compounds and it has been proposed to purify naphthalene from these sulfur compounds by repeated crystallization from various organic solvents. Such processes would, however, not be commercially feasible in connection with the commercial hydrogenation of naphthalene.

In accordance with the present invention, the naphthalene treated, namely, commercial or technical naphthalene, can be purified by treating it in a molten state with fuller's earth, infusorial earth, animal charcoal or the like, that is, any porous and finely-divided material, which naturally contains small quantities of metal oxides, such as lime, and which material is also capable of absorbing or adsorbing coloring matters, resinous substances or other materials of high molecular weight. The naphthalene can then be removed by filtering or by distillation at a temperature which is not sufficiently high to cause undesired side reactions, for example in vacuo. This purification may sometimes not be sufficiently complete and a more complete purification can be effected by the use, instead of the above mentioned porous materials alone, of fullers' earth upon which is precipitated a small amount, say 1 or 2 per cent or so, of reduced nickel, reduced iron or other like metal. During this purification step, it is advisable to agitate by stirring, pumping, etc. in the presence of hydrogen. The temperature in this operation should be kept above 100° C.

These metals also can be used alone in a finely-divided state for the purification of naphthalene.

Another method of purifying the naphthalene, which reduces the impurities to a very small quantity, involves the treatment of the molten naphthalene with small percentages of metallic sodium or potassium or other easily melted metals of like properties. In this operation it is advisable to treat the molten naphthalene with say, from one-half to one and one-half per cent of metallic sodium or potassium at a temperature above 100° C., for several hours.

Another useful method of purifying the naphthalene is by treating the same in a molten state (after a preliminary distillation if desired) with small amounts of metal compounds which contain a metal loosely combined with a non-acid radical or element. Examples of such compounds are the metal-ammonia compounds, metal amids (such as sodium or potassium amid), metal carbides (such as aluminum or calcium carbides), or other metal compounds of acetylene.

It is, of course, to be understood that these various methods of purification above given can be used each by itself, or two or more of these methods can be used in conjunction with each other.

Naphthalene purified according to the above processes does not produce any red coloration when treating with concentrated sulfuric acid and the purification should be so complete that even when the naphthalene so purified is ground up with hot concentrated sulfuric acid and allowed to stand hot for several hours, no substantial amount of red coloration is produced. If it is found that the purification of a particular batch has not been sufficiently completed, it is advisable to again subject this material to a retreatment according to one or the other of the above mentioned processes.

The naphthalene, after its purification, can be separated from the residue of the purifying agents, or from the compounds produced by the union of the impurities with the purifying agents, by hot pressure filtration in hydrogen, or by distillation at a relatively low temperature, distillation in vacuo being a preferred mode of operation.

The purified naphthalene can then be subjected to hydrogenation in the presence of finely-divided nickel as a catalyst, or otherwise, in accordance with the methods set forth in my application above referred to, without injury to the catalyst. It may be added that the purification of naphthalene from these substances which produce red coloration upon treatment with sulfuric acid, not only makes the catalyzer last better, that is to say—retain its usefulness for a long period, but also renders the hydrogenation of the naphthalene much easier and more readily controlled.

The highly impure varieties of naphthalene which give a deep red color with sulfuric acid, can be purified according to the processes herein described, and subsequently hydrogenated.

The following example is illustrative of the invention herein claimed, but is by no means to be considered as a limitation of its scope—

*Example.*—100 kilos of crude naphthalene in the shape of solid press cake obtained by the warm pressing process from coal tar still residues (after ordinary distillation if the mechanical impurities and higher boiling point tarry compounds are present in relatively large amount) are treated in a molten state with one kilo of sodium amid by stirring actively in a kettle for three hours, while the naphthalene is in a molten condition. The so treated naphthalene is separated from the other reaction products, preferably by distillation in vacuo. This naphthalene is found to give no red color, even after standing for several hours with concentrated sulfuric acid, and can then be hydrogenated.

In this example it is preferable to employ a temperature of over 100° C. Other purifying agents such as the metal ammonia compounds, potassium amid, metal carbides such as those of aluminum or calcium or metal acetylides, can be employed.

It will be understood that while I have described certain specific loosely combined metal compounds, I do not limit my invention to these specific compounds.

I claim:

1. A process of treating naphthalene to remove those impurities which act as catalyzer poisons on hydrogenation in the presence of a hydrogenation catalyst, which comprises subjecting naphthalene, at a temperature above its melting point to the action of a metal loosely combined with a non-acid agent.

2. A process of treating naphthalene to remove those impurities which act as catalyzer poisons on hydrogenation in the presence of a hydrogenation catalyst, which comprises subjecting naphthalene, at a temperature above its melting point to the action of a metal loosely combined with a non-acid radical.

3. A process of treating naphthalene to remove those impurities which act as catalyzer poisons on hydrogenation in the presence of a hydrogenation catalyst, which comprises subjecting naphthalene, at a temperature above its melting point to the action of an amid of alkali metal.

4. A process of treating naphthalene to remove those impurities which act as catalyzer poisons on hydrogenation in the presence of a hydrogenation catalyst, which comprises subjecting naphthalene, at a temperature above its melting point to the action of a sodium amid.

In testimony whereof I have signed my name to this specification.

GEORG SCHROETER.